US011853750B2

(12) United States Patent
Hicks et al.

(10) Patent No.: US 11,853,750 B2
(45) Date of Patent: Dec. 26, 2023

(54) SUBJECT MATTER EXPERT IDENTIFICATION AND CODE ANALYSIS BASED ON A PROBABILISTIC FILTER

(71) Applicant: International Business Machines Corporation, Armonk, NY (US)

(72) Inventors: Andrew C. M. Hicks, Highland, NY (US); Robert Peter Catalano, Montgomery, NY (US); Tyler Vezio Rimaldi, Mahopac, NY (US); Daniel Nicolas Gisolfi, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 17/120,370

(22) Filed: Dec. 14, 2020

(65) Prior Publication Data

US 2022/0188103 A1 Jun. 16, 2022

(51) Int. Cl.
  *G06F 9/44* (2018.01)
  *G06F 8/75* (2018.01)
  *G06F 18/22* (2023.01)
  *G06N 5/01* (2023.01)
  *G06N 7/01* (2023.01)

(52) U.S. Cl.
  CPC ............... *G06F 8/75* (2013.01); *G06F 18/22* (2023.01); *G06N 5/01* (2023.01); *G06N 7/01* (2023.01)

(58) Field of Classification Search
  None
  See application file for complete search history.

(56) References Cited

U.S. PATENT DOCUMENTS 9,158,847 B1 * 10/2015 Majumdar .......... G06F 16/9024
9,305,279 B1 * 4/2016 Menzel .................... G06F 8/75
10,474,457 B1 * 11/2019 Pham .................. G06F 16/9538
(Continued)

FOREIGN PATENT DOCUMENTS

CN         103823896 B     2/2017
WO    WO-2018222776 A1 * 12/2018 ....... G06F 16/24575

OTHER PUBLICATIONS

Visual Paradigm, "Radar Chart Example: Employee Skill Analysis" https://online.visual-paradigm.com/diagrams/templates/radar-chart/employee-skill-analysis/ (Retrieved Nov. 11, 2020), 1 page.

*Primary Examiner* — Insun Kang
(74) *Attorney, Agent, or Firm* — Teddi Maranzano; Cantor Colburn LLP

(57) ABSTRACT

A computer-implemented method includes receiving a portion of code, inputting the received portion of code to a probabilistic data structure to determine whether the portion of code is similar to one or more other portions of code, and based on determining that the one or more other portions are similar to the received portion of code, identifying a number of similar portions of code. The method also includes storing relationship data that associates the similar portions of code with the received portion of code, determining one or more subject matter experts (SMEs) associated with the similar portions of code and the received portion of code and determining correlations between SME data and the relationship data, and storing the SME data and the correlations, the SME data including an indication of the determined SMEs, the relationship data correlating the one or more SMEs to the received portion of code.

14 Claims, 6 Drawing Sheets

(56) References Cited

U.S. PATENT DOCUMENTS

| | | |
|---|---|---|
| 10,657,117 B2 | 5/2020 | Arora et al. |
| 2014/0137074 A1* | 5/2014 | Hey .......................... G06F 8/70 |
| | | 717/101 |
| 2014/0163964 A1* | 6/2014 | Chen ..................... G06F 40/237 |
| | | 704/9 |
| 2015/0339616 A1 | 11/2015 | Pursche et al. |
| 2016/0179812 A1* | 6/2016 | Briggs ...................... G06F 8/70 |
| | | 717/101 |
| 2019/0065972 A1* | 2/2019 | Rais-Ghasem ....... G06F 16/248 |
| 2019/0303140 A1* | 10/2019 | Kelly ........................ G06F 8/75 |
| 2020/0133441 A1* | 4/2020 | Smith .................. G06F 16/2246 |
| 2020/0226054 A1* | 7/2020 | Lavigne .................... G06F 8/77 |
| 2021/0168161 A1* | 6/2021 | Dunn .................... G06F 21/554 |

* cited by examiner

SUBJECT MATTER EXPERT IDENTIFICATION AND CODE ANALYSIS BASED ON A PROBABILISTIC FILTER

BACKGROUND

The present invention generally relates to computer systems, and more specifically, to subject matter expert identification for computer software.

In computer science, code libraries are available to software developers to facilitate the writing of code. Code libraries store source code written in various programming languages, which are available to programmers to reduce the amount of work and time expended, by providing pre-written code that can be incorporated into a program without requiring a programmer to create the code from scratch. Libraries can include sets of predefined modules, or functions, each having a defined interface that is used to invoke a particular behavior. Library code can be reused across any number of independent software programs, and often multiple libraries are accessed when code is written. Computer programmers responsible for pieces of code in a library can be identified as subject matter experts. In some cases, it may be desirable, for a given piece of code, to determine a subject matter expert, for example, if a potential defect is encountered.

SUMMARY

Embodiments of the present invention are directed to subject matter expert identification for computer software. An embodiment of a computer-implemented method includes receiving, by a processor, a portion of code, the portion of code stored as part of a corpus of code, inputting the received portion of code to a probabilistic data structure to determine whether the portion of code is similar to one or more other portions of code in the corpus, and based on determining that the one or more other portions are similar to the received portion of code, identifying a number of similar portions of code. The method also includes storing relationship data that associates the similar portions of code with the received portion of code, determining one or more subject matter experts (SMEs) associated with the similar portions of code and the received portion of code and determining correlations between SME data and the relationship data, and storing the SME data and the correlations, the SME data including an indication of the determined SMEs, the relationship data correlating the one or more SMEs to the received portion of code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide subject matter expert identification for computer software. An embodiment of a code analysis and/or subject matter expert identification system is configured to determine correlations between computer code and subject matter experts. In one embodiment, the system utilizes a probabilistic data structure, such as a Bloom filter, to facilitate the identification of one or more subject matter experts associated with a given portion of code.

In one embodiment, the system is configured to receive a portion of a line of code or set of code, and input the code portion to the probabilistic data structure. The probabilistic data structure determines whether a code portion similar to the received code portion was previously input to the data structure. A code portion is similar to a received portion if they have the same string of values, perform the same or related functions, or have other commonalities.

As code portions are successively input to the probabilistic data structure, a set of relationship data is generated that specifies relationships between code portions. For example, the relationship data indicates the number of inputs of a given code portion (or similar code portions). The relationship data may be in the form of a look-up table, a linked list, a decision tree or other data structure that expresses code portion relationships.

Generating the relationship data also includes correlating each stored code portion with a subject matter expert, to allow a programmer or system to perform a search for a code portion and identify one or more subject matter experts associated with the code portion. In one embodiment, the relationship data includes a ranking of each subject matter expert correlated with a code portion. The ranking may be based on user preferences, for example.

Embodiments described herein provide a number of advantages. The system, utilizing the probabilistic data structure, is able to generate relationship data for use in identifying subject matter experts in a computationally efficient and space efficient manner. The embodiments provide an intelligent form of caching that is useful, for example, when analyzing large sets of code.

Figure 1:
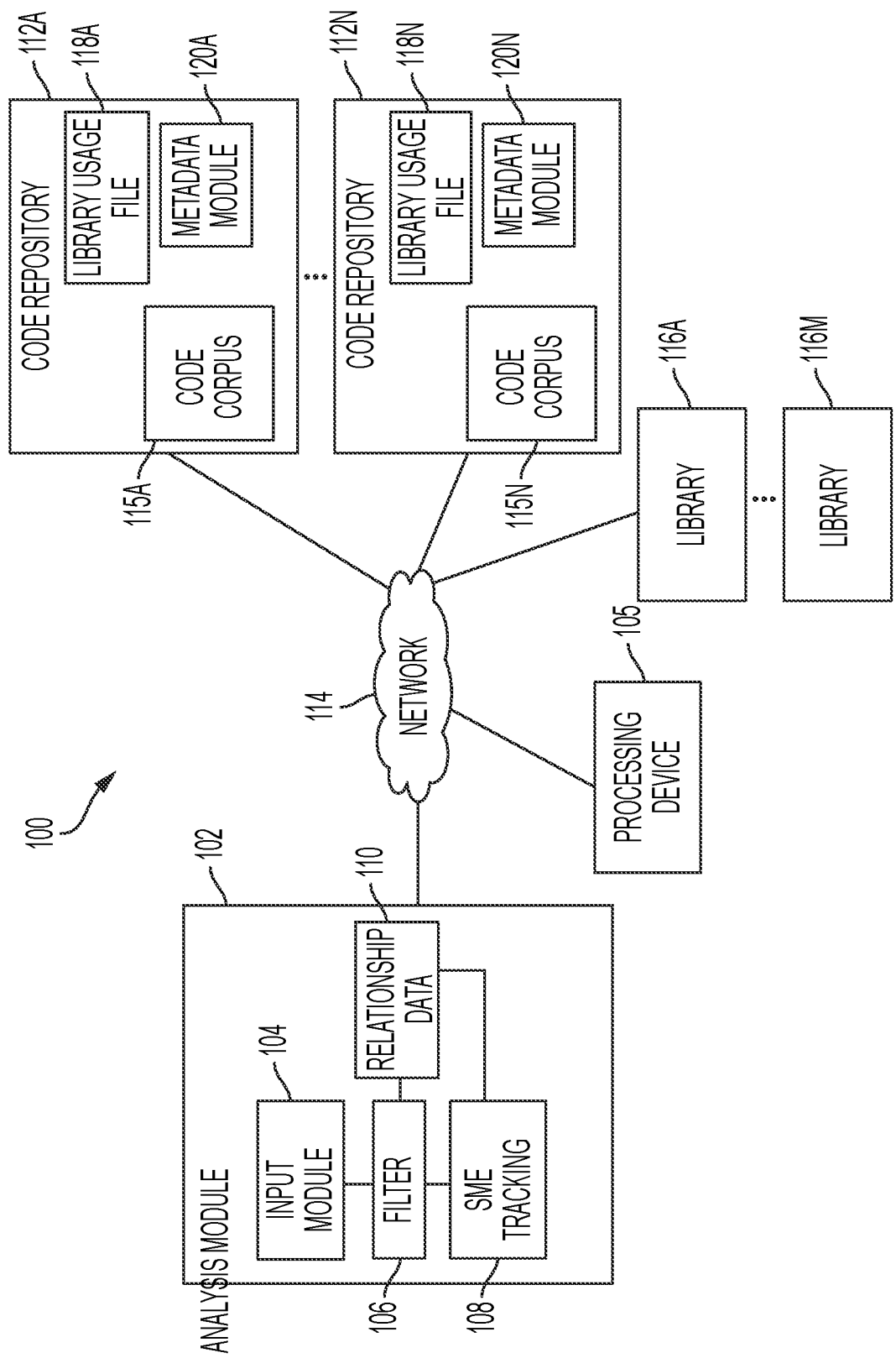
FIG. 1 is a block diagram of components of a system for code analysis and subject matter expert identification, in accordance with one or more embodiments of the present invention.

FIG. 1 depicts a system 100 for code analysis and subject matter expert identification, in accordance with one or more embodiments of the present invention. Embodiments of the system 100 of FIG. 1 can be implemented in conjunction with any appropriate computer system, including but not limited to the computer system 400 of FIG. 4, and or the cloud computing system of FIGS. 5 and 6.

The system 100 includes an analysis module 102 configured to receive an input in the form of code information. Code information may include a portion of code and/or other information related to a line or set of code, such as a subject matter expert, a code library, an owner of a code library, and others. A "portion of code" or "code portion" refers to a word, phrase, function, operation, sequence, bundle, module, or other recognizable string of values. The analysis module 102 includes an input module 104 for receiving the input, which may be a search request from a user or system, such as a user processing device 105, or part of a code review process. A filter module 106 is configured to input a portion of code or other code information to a probabilistic structure, which may be a space-efficient probabilistic filter such as a Bloom filter, a Quotient filter, a Count-Min Sketch algorithm or structure, a Top-K algorithm or structure, a Hyper LogLog algorithm or structure, and others. Generally, the filter module 106 utilizes a probabilistic data structure to determine whether the code information is similar to previous inputs. Two pieces of code information are considered to be "similar" if they include the same string of values, perform the same or similar function, or otherwise induce the same or related behavior. The filter provides a space efficient and quick way to identify similar code information and identify subject matter experts without the need to scan an entire code corpus.

Based on the output from the filter module, a subject matter expert (SME) tracking module 108 stores the portion of code (or an indicator thereof, such as an index, key or token) as relationship data. The relationship data may be in any suitable relationship data structure 110 that can represent relations between portions of code or other code information. Examples of such structures include decision trees, linked lists and look-up tables. For example, as portions of code are passed through the filter module 106, they may be stored in a manner that relates each portion of code to one or more similar portions of code. Although the relationship data is shown is included in the analysis module 102, it is not so limited and can be stored in any suitable location, for example, in a code repository.

The SME tracking module 108, in one embodiment, is configured to correlate each stored portion of code in the relationship data with a subject matter expert or SME. The SME for a given code portion can be determined, for example, by locating a library or other location from which the portion of code was acquired (and finding the owner and SME from the library). The SME can also be determined from a code annotation or tag, or otherwise. The SME tracking module 108 relates the portions of code to SMEs, so that an SME for a given portion of code can be more easily and quickly identified as compared to conventional systems.

As shown in FIG. 1, received code portions (i.e., code portions input to the analysis module 102) and/or other code information may be acquired from one or more code repositories. For example, a number n of code repositories 112A-N are communicatively coupled to the analysis module 102 via a network 114, such as a wide-area network or the Internet.

Each code repository 112A-N includes a code base (also referred to as a corpus 115A-115N) of source code that can be written in any appropriate computer programming language(s), and can include any appropriate number of files. The code repositories 112A-N can include any number of private and public code repositories in various embodiments of the invention. The source code in code repositories 112A-N can use any number m of libraries 116A-116M, and the libraries can be any appropriate types of libraries, including but not limited to standard libraries, custom libraries, dynamic libraries, and static libraries.

The code repositories 112A-N may include additional information to facilitate searching. For example, each code repository can include a respective library usage data file 118A-N that includes data (e.g., location data) regarding each library call in the source code of the corresponding code repository. For example, library usage data file 118A-N each include a list of library calls and their respective locations in the source code of the code repositories.

The SME tracking module 108 may determine SMEs related to portions of code, for example, by identifying an owner of the library or libraries from which portions of code were called. For example, the system 100 of FIG. 1 includes version control metadata modules 120A-120N associated with respective code repositories, which include data regarding the identity of the computer programmer(s) that wrote each unit (e.g., line or snippet) of source code in the respective code repositories 112A-N. Particular computer programmers that are SMEs related to a library can be determined based on the determined matching library calls and version control metadata modules 120A-N.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, code repositories, files, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
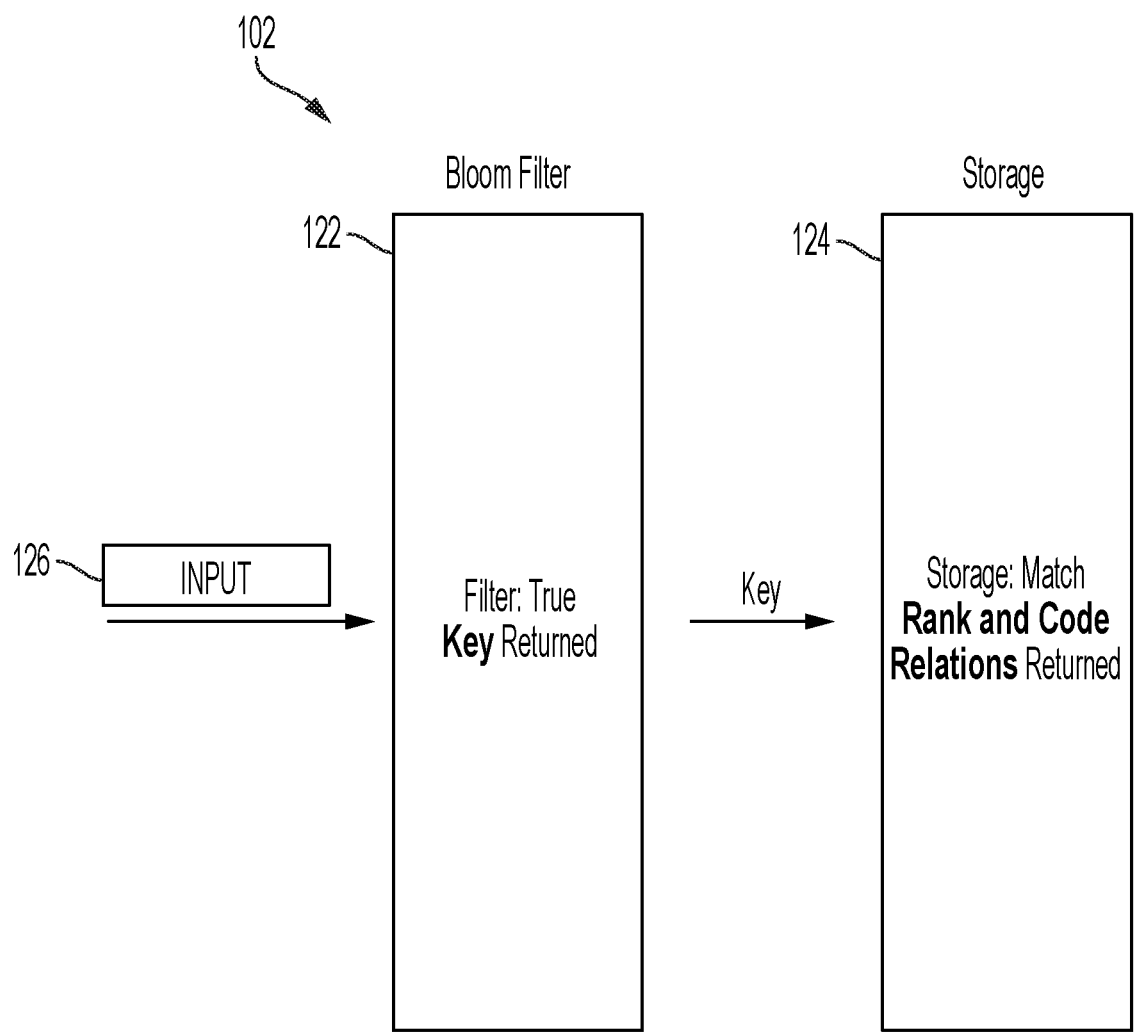
FIG. 2 depicts an example of a probabilistic data structure used to analyze code information, in accordance with one or more embodiments of the present invention.

FIG. 2 depicts components of an embodiment of the analysis module 102. In this embodiment, the filter module 106 includes or is connected to a probabilistic and space-efficient data structure, such as a Bloom filter 122. A Bloom filter is a space efficient probabilistic data structure that is used in a binary relationship with input data and recognized data. When given an input 126 such as a code portion or SME identifier, the Bloom filter 122 will recognize if the inputted code portion has already been seen (i.e., one or more similar code portions have already been input to the filter).

Based on an output from the Bloom filter 122, a received code portion may be input to a relationship data structure in a storage location 124, which may be a location in the analysis module 102, in a code repository 112A-N, or any other suitable location. As discussed further below, the analysis module 102 may be configured to input the received code portion (or an indicator thereof) based on a minimum number of similar portions that were previously input to the Bloom filter 122 (or other probabilistic data structure).

Figure 3:
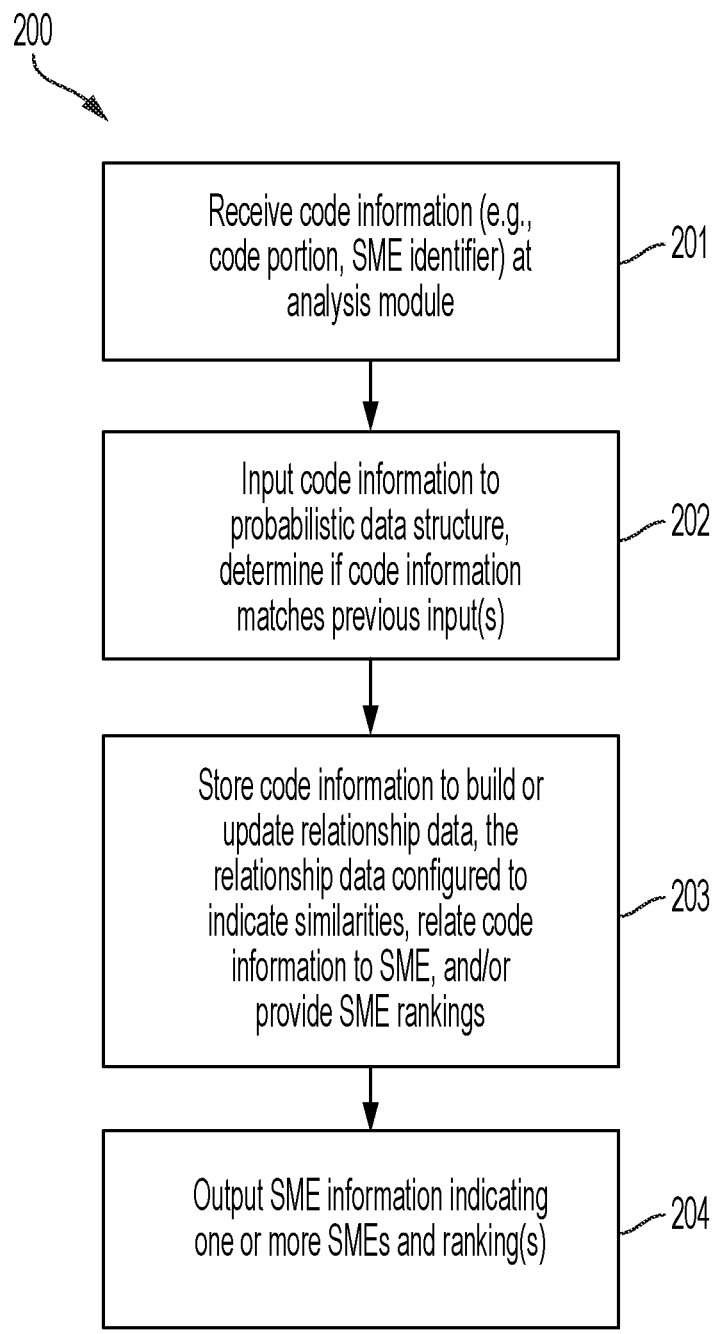
FIG. 3 is a flow diagram depicting a method of analyzing code information and identifying one or more subject matter experts, in accordance with one or more embodiments of the present invention.

FIG. 3 depicts an embodiment of a method 200 of code analysis and SME identification. The method 200 is discussed in conjunction with the system 100 of FIG. 1 and the Bloom filter 122 of FIG. 2. However, the method 200 is not so limited, as the method 200 can be performed by any suitable processing device, tool or system that can analyze code data, and can be performed using any suitable probabilistic data structure.

The method 200 is discussed in conjunction with blocks 201-204. The method 200 is not limited to the number or order of steps therein, as some steps represented by blocks 201-204 may be performed in a different order than that described below, or fewer than all of the steps may be performed.

At block 201, a code portion is received by the analysis module 102. The code portion may be received as part of a search query by a user, or received as part of a code review. The received code portion may be part of any type of code in any programming language (structured or unstructured). For example, the code portion may be software code, firmware code, source code, programming code, or any other code written in any coding language now known or later developed.

At block 202, the received code portion is input as a key to the Bloom filter 122 or other probabilistic data structure. The Bloom filter 122 determines whether the code portion or a similar code portion has been previously input to the filter.

For example, the Bloom filter 122 includes a hash table or bit field, in which previously seen code portions were mapped to respective bit positions (hash codes) via a number of hash functions. When the Bloom filter 122 receives the code portion, it calculates a hash code for the received portion and uses the hash code to determine whether the received code portion has been previously encountered. It is noted that other types of data structures can be used here that map occurrences of a code portion, such as hash tables.

If the received code portion is new to the Bloom filter 122 (filter returns "False"), the filter uses the hash code and store a 0 or 1 in the index position or positions corresponding to the hash function.

If the received code portion has been seen before, the Bloom filter 122 returns "True", indicating that the received code portion or similar code portion (e.g., the received code portion, or index or hash code of the input, as configured by use case) has been seen before. In one embodiment, the Bloom filter's input recognition can be customized based on user defined rankings. Examples of rankings include a ranking based on how often an item was searched for (e.g., number and/or frequency of searches), For example, inputs to the Bloom filter 122 can be associated with a target list of inputs or key words having rankings defined by a user or users, to develop a sense of priority through custom ranking. Certain input types can thus be treated with a higher priority based on user rankings, e.g., to load balance against a large influx input at a given time.

At block 203, the code portion (or an index or other identifier) is input to the relationship data that indicates relationships among the various code portions that were input to the Bloom filter 122. The relationship data may include self-balancing binary search trees, tries, hash tables, or simple arrays or linked lists of relative similarities to the set of code give. The code portion is input to the relationship data in order to update the relationship data.

As part of the update, the analysis module 102 determines an SME associated with the received code portion, and stores the associated SME in the relationship data. The analysis module 102 determines the SME, for example, by identifying a library associated with the code portion, checking the code portion itself, checking annotations or metadata, or by consulting any available sources of information. The SME may be assigned a ranking based on various criteria. For example, SMEs can be ranked based on the number of code portions related thereto, with a higher number corresponding to a higher ranking. The ranking helps to simplify SME selection decisions.

In one embodiment, the analysis module 102 is configured to input code information to the relationship data based on the received code portion satisfying selected criteria. For example, the received portion is input to the relationship data if the number of similar code portions (i.e., the number of previous inputs having the same hash or otherwise being similar to the received code portion) meets or exceeds a selected threshold number. The threshold number may be zero (i.e., the filter has not seen the received code portion), or non-zero (e.g., 10 or more). This criteria are useful in reducing processing time, for example, when analyzing large sets of code.

In addition, or alternatively, other criteria may be used to control whether the received code portion is input to the relationship data. Examples include a frequency of input related to similar code portions, or any other measure related to how often the code portion was input. If the criteria are not satisfied, the Bloom filter 122 returns a result, but the received code portion is not input to the relationship data.

At block 204, to aid in the decision regarding selection of a SME, the analysis unit 102 outputs SME information from the relationship data in response to an input or query. For example, if a user searches for a particular SME (e.g., by providing a contact of the SME, such as an email or phone number), an indicator of the SME is input to the Bloom filter 122. If the SME is present in the relationship information, SME data is presented to a user along with the SMEs ranking, and optionally more detail regarding the SME (e.g., how many code portions are associated with the SME, etc.). The SME data may also include other SMEs and their rankings.

The method 200 can be used as part of, or to facilitate, automated code review, including automated code review using quantitative linguistics (QL). Code review is a quality assurance activity used in software, firmware, and/or other code development. Code review can be used to identify defects (e.g., bugs, errors, inaccurate performance, etc.) and/or to improve code quality (e.g., improve robustness, improve efficiency, improve maintainability, etc.). During such a review, if errors or bugs are found, it is desirable to be able to readily determine a SME.

Figure 4:
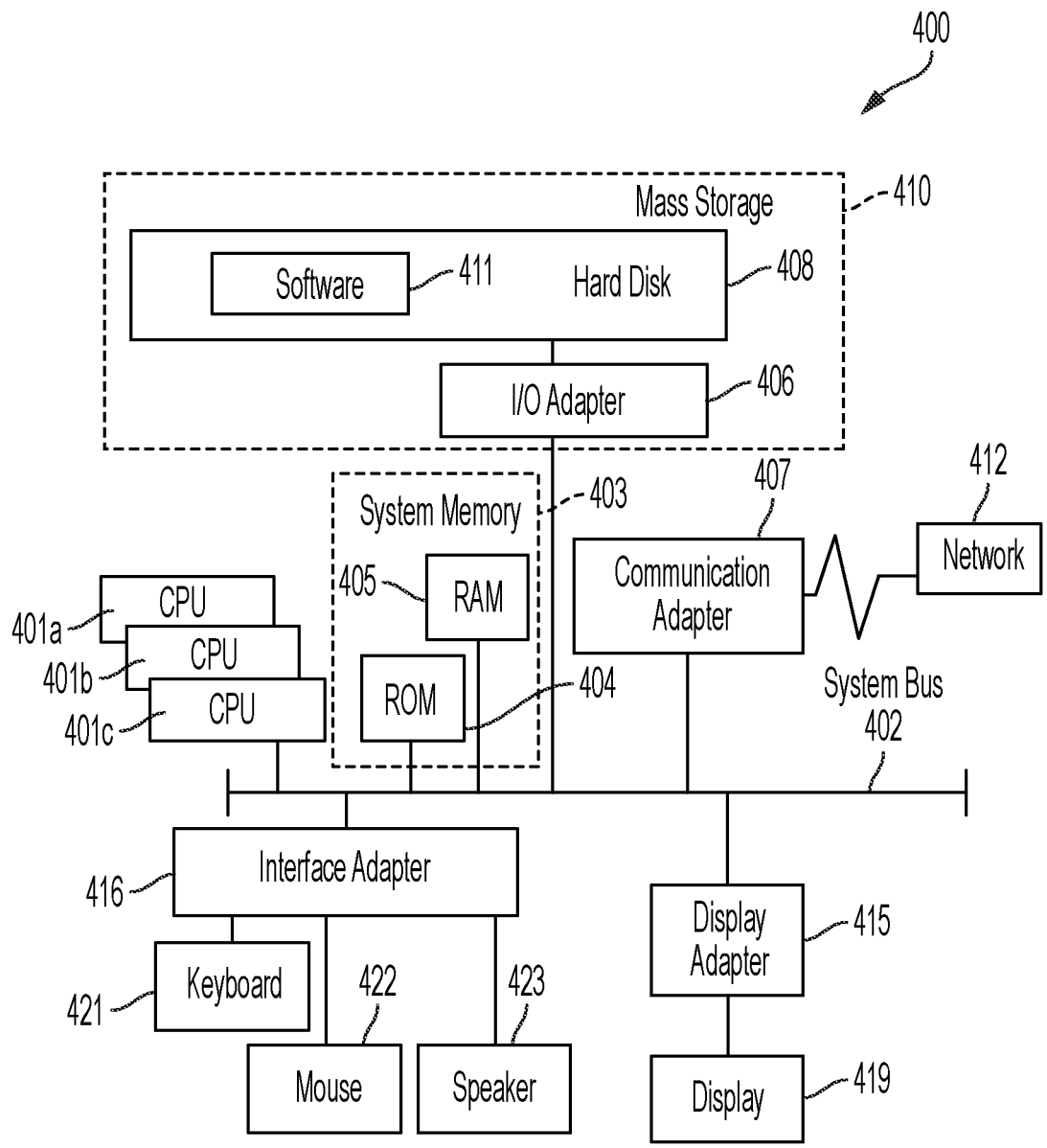
FIG. 4 is a block diagram of an example computer system for use in conjunction with one or more embodiments of the present invention.

Referring to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
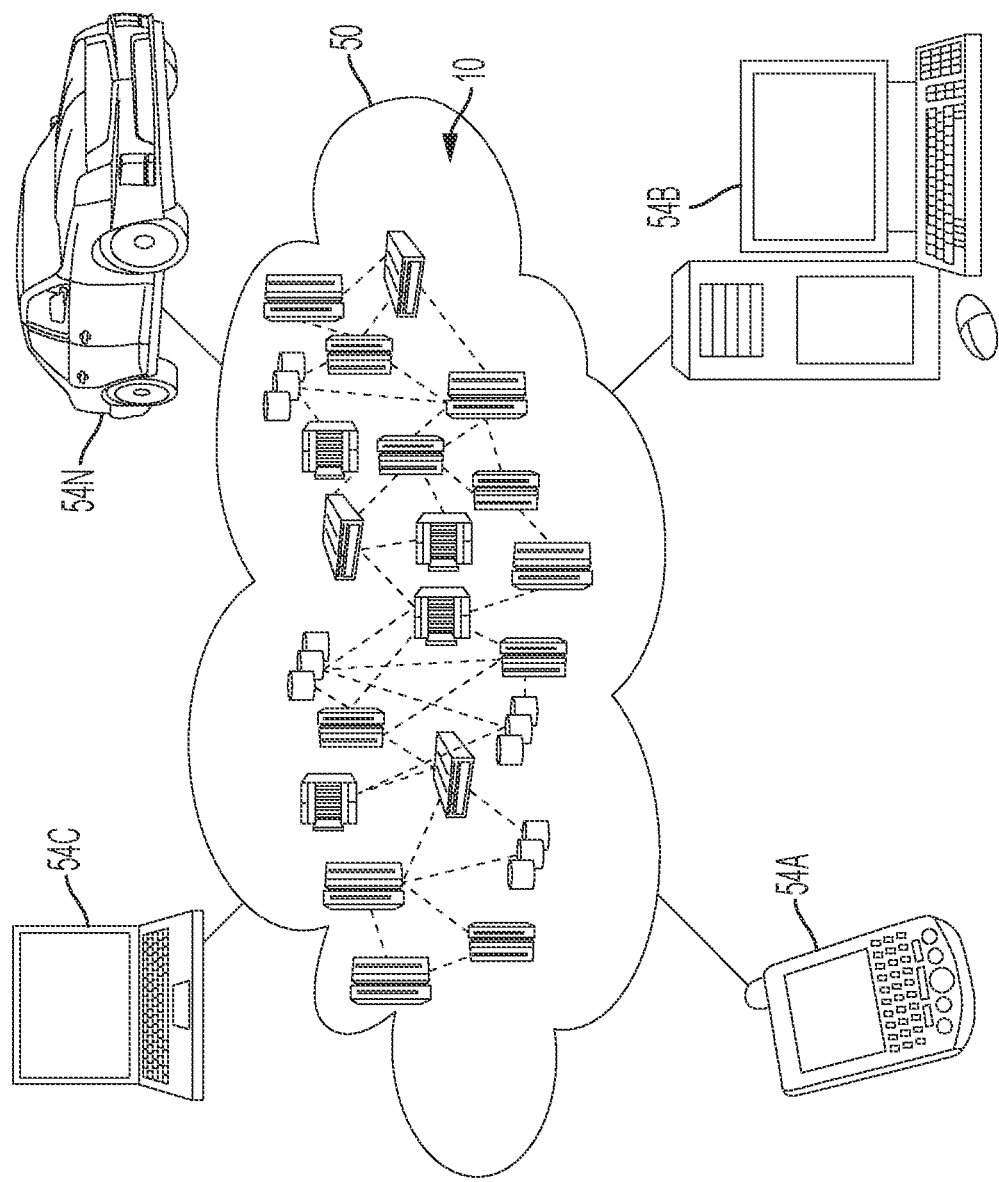
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
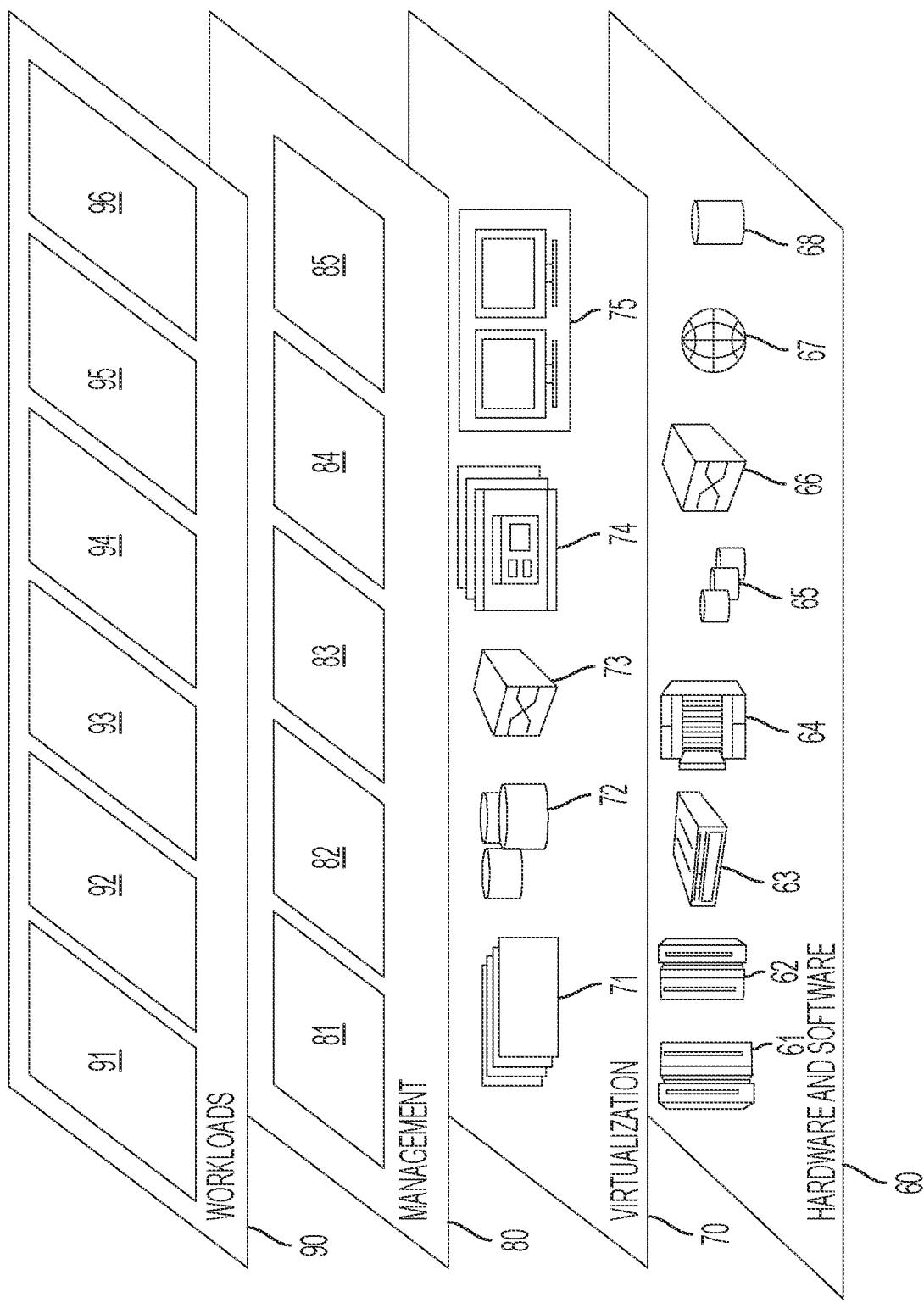
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code analysis and subject matter expert identification 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a set of portions of code, the set of portions of code stored as part of a corpus of code in a code repository;
comparing each portion of code and an input type of each portion of code to a ranked list of target input types and key words, each target input type having a ranking based on a user preference;
selecting a portion of code according to a priority of the selected portion of code relative to a remainder of the set, the priority based on the ranking of the input type associated with the selected portion of code;
inputting, by an analysis module, the selected portion of code to a probabilistic data structure to determine whether the selected portion of code is similar to one or more other portions of code in the corpus stored in the code repository;
based on determining, by the probabilistic data structure, that the one or more other portions are similar to the selected portion of code, identifying, by the probabilistic data structure, a number of similar portions of code that were previously input to the probabilistic data structure;

based on the identifying, storing relationship data, in a storage location, that associates the similar portions of code with the selected portion of code;

determining, by a tracking module, one or more subject matter experts (SMEs) associated with the similar portions of code and the selected portion of code based on the relationship data stored in the storage location, and determining correlations between SME data and the relationship data, the SME data including an indication of the determined SMEs, the correlations including an identification of the one or more SMEs associated with each similar portion of code, each SME assigned a ranking based on a number of the similar portions of code associated with the one or more SMEs;

storing the selected portion of code, the SME data and the correlations in the relationship data in the storage location, the relationship data correlating the one or more SMEs to the selected portion of code;

presenting one or more identified SMEs and one or more rankings associated with the one or more identified SMEs for the selected portion of code to a user, based on the relationship data and the one or more rankings stored in the storage location; and automatically selecting at least one of the one or more identified SMEs based on user input and the one or more rankings associated with the at least one of the one or more identified SMEs.

2. The method of claim 1, wherein storing the relationship data is based on the number of the similar portions of code being greater than a selected threshold.

3. The method of claim 1, further comprising:
receiving an identifier of a SME as part of a search request;
inspecting the relationship data to determine whether the SME is represented in the relationship data; and
based on locating the SME, outputting information including a rank assigned to the SME.

4. The method of claim 1, wherein the probabilistic data structure includes a Bloom filter.

5. The method of claim 1, wherein the relationship data includes a self-balancing decision tree.

6. A system comprising:
a memory having computer readable instructions; and
one or more processors for executing the computer readable instructions, the computer readable instructions controlling the one or more processors to perform operations comprising:
receiving, by a processor, a set of portions of code, the set of portions of code stored as part of a corpus of code in a code repository;
comparing each portion of code and an input type of each portion of code to a ranked list of target input types and key words, each target input type having a ranking based on a user preference;
selecting a portion of code according to a priority of the selected portion of code relative to a remainder of the set, the priority based on the ranking of the input type associated with the selected portion of code;
inputting, by an analysis module, the selected portion of code to a probabilistic data structure to determine whether the selected portion of code is similar to one or more other portions of code in the corpus stored in the code repository;
based on determining, by the probabilistic data structure, that the one or more other portions are similar to the selected portion of code, identifying, by the probabilistic data structure, a number of similar portions of code that were previously input to the probabilistic data structure;

based on the identifying, storing relationship data, in a storage location, that associates the similar portions of code with the selected portion of code;

determining, by a tracking module, one or more subject matter experts (SMEs) associated with the similar portions of code and the selected portion of code based on the relationship data stored in the storage location, and determining correlations between SME data and the relationship data, the SME data including an indication of the determined SMEs, the correlations including an identification of the one or more SMEs associated with each similar portion of code, each SME assigned a ranking based on a number of the similar portions of code associated with the one or more SMEs;

storing the selected portion of code, the SME data and the correlations in the relationship data in the storage location, the relationship data correlating the one or more SMEs to the selected portion of code;

presenting one or more identified SMEs and one or more rankings associated with the one or more identified SMEs for the selected portion of code to a user, based on the relationship data and the one or more rankings stored in the storage location; and automatically selecting at least one of the one or more identified SMEs based on user input and the one or more rankings associated with the at least one of the one or more identified SMEs.

7. The system of claim 6, wherein storing the relationship data is based on the number of the similar portions of code being greater than a selected threshold.

8. The system of claim 6, the operations further comprising:
receiving an identifier of a SME as part of a search request;
inspecting the relationship data to determine whether the SME is represented in the relationship data; and
based on locating the SME, outputting information including a rank assigned to the SME.

9. The system of claim 6, wherein the probabilistic data structure includes a Bloom filter.

10. The system of claim 6, wherein the relationship data includes a self-balancing decision tree.

11. A computer program product comprising a computer readable storage medium having program instructions embodied therewith, the program instructions executable by one or more processors to cause the one or more processors to perform operations comprising:
receiving, by a processor, a set of portions of code, the set of portions of code stored as part of a corpus of code in a code repository;
comparing each portion of code and an input type of each portion of code to a ranked list of target input types and key words, each target input type having a ranking based on a user preference;
selecting a portion of code according to a priority of the selected portion of code relative to a remainder of the set, the priority based on the ranking of the input type associated with the selected portion of code;
inputting, by an analysis module, the selected portion of code to a probabilistic data structure to determine whether the selected portion of code is similar to one or more other portions of code in the corpus stored in the code repository;

based on determining, by the probabilistic data structure, that the one or more other portions are similar to the selected portion of code, identifying, by the probabilistic data structure, a number of similar portions of code that were previously input to the probabilistic data structure;

based on the identifying, storing relationship data, in a storage location, that associates the similar portions of code with the selected portion of code;

determining, by a tracking module, one or more subject matter experts (SMEs) associated with the similar portions of code and the selected portion of code based on the relationship data stored in the storage location, and determining correlations between SME data and the relationship data, the SME data including an indication of the determined SMEs, the correlations including an identification of the one or more SMEs associated with each similar portion of code, each SME assigned a ranking based on a number of the similar portions of code associated with the one or more SMEs;

storing the selected portion of code, the SME data and the correlations in the relationship data in the storage location, the relationship data correlating the one or more SMEs to the selected portion of code;

presenting one or more identified SMEs and one or more rankings associated with the one or more identified SMEs for the selected portion of code to a user, based on the relationship data and the one or more rankings stored in the storage location; and automatically selecting at least one of the one or more identified SMEs based on user input and the one or more rankings associated with the at least one of the one or more identified SMEs.

12. The computer program product of claim 11, wherein storing the relationship data is based on the number of the similar portions of code being greater than a selected threshold.

13. The computer program product of claim 11, the operations further comprising: receiving an identifier of a SME as part of a search request; inspecting the relationship data to determine whether the SME is represented in the relationship data; and based on locating the SME, outputting information including a rank assigned to the SME.

14. The computer program product of claim 11, wherein the probabilistic data structure includes a Bloom filter.

* * * * *